United States Patent
McGill

(10) Patent No.: US 7,380,725 B2
(45) Date of Patent: Jun. 3, 2008

(54) ENTERPRISE-WIDE NETWORKED SYSTEM AND METHOD FOR MANAGING AND DISPLAYING PRICE AND PRODUCT INFORMATION

(76) Inventor: Randy McGill, 5680 Crosswinds Ct., St. Augustine, FL (US) 32092

( * ) Notice: Subject to any disclaimer, the term of this patent is extended or adjusted under 35 U.S.C. 154(b) by 191 days.

(21) Appl. No.: 11/160,514

(22) Filed: Jun. 27, 2005

(65) Prior Publication Data
US 2005/0284933 A1 Dec. 29, 2005

Related U.S. Application Data
(60) Provisional application No. 60/582,912, filed on Jun. 26, 2004.

(51) Int. Cl.
*G06K 7/10* (2006.01)
(52) U.S. Cl. .............................. 235/472.01; 235/462.18
(58) Field of Classification Search .......... 235/472.01, 235/435, 385, 462.18; 705/16, 20, 27
See application file for complete search history.

(56) References Cited

U.S. PATENT DOCUMENTS

| | | | |
|---|---|---|---|
| 5,753,900 A * | 5/1998 | Goodwin et al. ............ 235/383 |
| 5,910,653 A * | 6/1999 | Campo ................. 250/214 AL |
| 6,000,611 A * | 12/1999 | Dalton et al. ............... 235/383 |
| 6,427,138 B1 * | 7/2002 | Witt ............................. 705/20 |
| 6,584,449 B1 * | 6/2003 | Otto ............................. 705/20 |
| 6,715,676 B1 * | 4/2004 | Janning ..................... 235/383 |
| 7,152,040 B1 * | 12/2006 | Hawthorne et al. ........... 705/16 |
| 2003/0065560 A1 * | 4/2003 | Brown et al. ................. 705/14 |
| 2004/0118923 A1 * | 6/2004 | Creamer et al. ....... 235/462.01 |
| 2004/0210494 A1 * | 10/2004 | White ......................... 705/28 |
| 2005/0237153 A1 * | 10/2005 | Chen ........................ 340/5.91 |

* cited by examiner

Primary Examiner—Thien M Le
(74) Attorney, Agent, or Firm—Mark Young, P.A.

(57) ABSTRACT

A digital display unit (DDU), which may be integrated into an enterprise-wide networked system for managing and displaying price and product-related information, is adapted to wirelessly receive price and product data from a local computer system and clearly display information based thereon. Updating price information in a local POS product price database causes a DDU control computer to communicate the price information to the DDU. A synthetic barcode module detects the presence of a barcode scanner and produces light output that emulates reflected light corresponding to a scanned barcode. A DDU may receive, store and display information for a plurality of products.

19 Claims, 9 Drawing Sheets

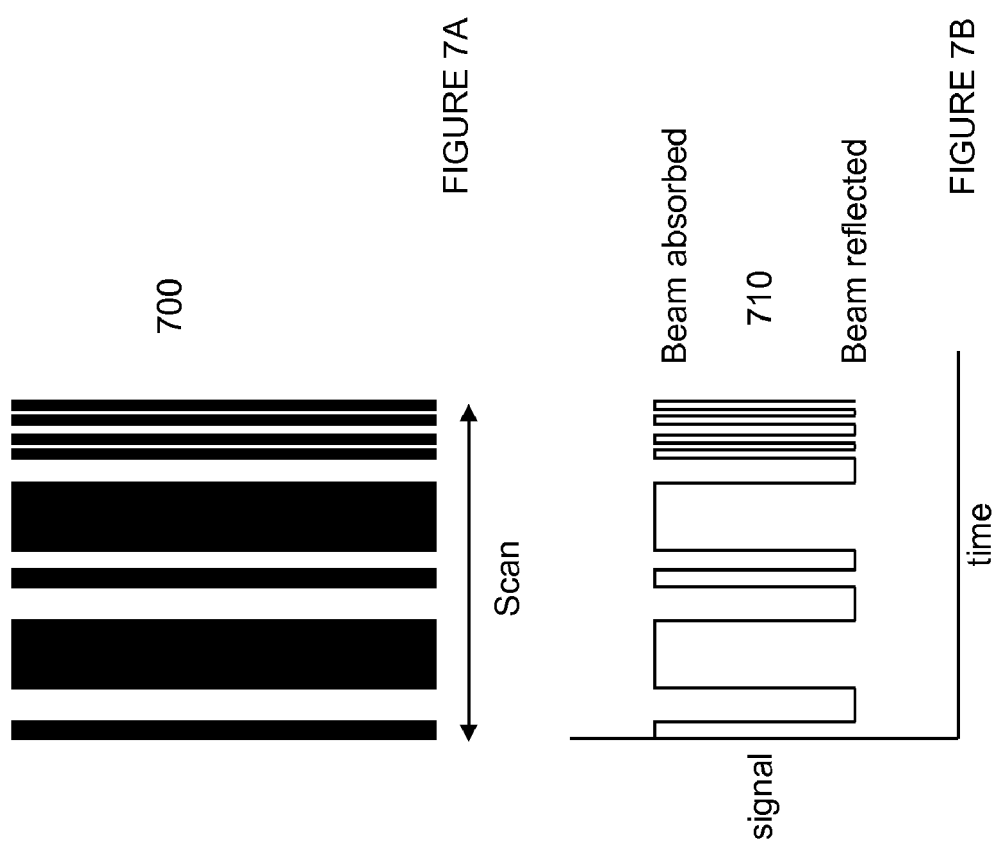

ENTERPRISE-WIDE NETWORKED SYSTEM AND METHOD FOR MANAGING AND DISPLAYING PRICE AND PRODUCT INFORMATION

RELATED APPLICATION

This application claims the benefit of priority to U.S. Provisional Application No. 60/582,912 filed Jun. 26, 2004, the entire contents of which are incorporated herein and made a part hereof.

FIELD OF THE INVENTION

This invention generally relates to a system and method for displaying price and product-related information, and more particularly, to a display unit that can be integrated in an enterprise-wide networked system for managing and displaying price and product-related information.

BACKGROUND

Retailers typically display pricing information on printed tags attached to store shelves adjacent to corresponding products. In addition to price, such tags often include information such as size, weight, unit price and other identifying information. While tags are sufficient for informing consumers of product prices, they do not facilitate the process of updating displayed prices. This shortcoming is particularly problematic in cases of products with volatile pricing. Prices of such items may fluctuate frequently, such as daily. This means that the printed price tags would have to be replaced daily with corrected tags. In a store with hundreds or thousands of products, this task can be extremely laborious and conducive to error. The problems are compounded in an enterprise with many such stores.

Most modern retail stores implement some form of computer technology in their operations. This typically consists of using point-of-sale (POS) systems for automating checkout procedures. A POS system generally has one or more automated checkout terminals each of which is equipped with a scanner that is capable of sensing and interpreting a printed barcode or other indicia that corresponds to a product identifier, such as Universal Product Code (UPC) or Stock Keeping Unit (SKU). Checkout terminals communicate with a POS database that associates various items of information with each UPC/SKU, including price and inventory information. When a customer is ready to make a purchase, the store clerk uses a scanner to sense the barcode markings on each of the customer's items. The checkout terminal determines the UPC/SKU, obtains the price for each item, and keeps a running total of the purchase.

Changing prices with such systems can be tedious and conducive to error. Two things must occur to effect a change. First, the POS database must be modified to reflect the price change. When this happens, the new price will apply to customer purchases at the checkout terminal. Second, the price tag (i.e., displayed price) for each of the affected items must be changed. If a tag is not replaced or displays an erroneous price, the charged price will not equal the displayed price.

Displaying a correct price is important. Both customer satisfaction and legal compliance necessitate that a displayed price match the price in the POS database. A growing number of states have item-pricing laws that require retailers to display an accurate price on or adjacent to each product. In these states, retailers are subject to governmental inspections and penalties for non-compliance. Legal compliance demands conformance of displayed prices with prices charged at checkout. Customer satisfaction requires accurate pricing clearly displayed on the store shelves.

For an enterprise with a plurality of stores, it is also important to synchronize each store's local POS database with the enterprise's central POS database, so that an applicable pricing change in the central database triggers the same change in each local database. Illustratively, each store in a retail chain may have a local computer system with a local POS database that is communicatively coupled via one or more networks to a remote enterprise server. This allows the database of each store to be modified by changing only the database of the enterprise server.

While electronic price display label (EPL) systems are known in the art, they are quite limited in their adaptability. Such systems are not designed to interface with conventional POS systems. Instead, they require proprietary closed software to enable electronic price display at store shelves. It is desirable to provide an electronic price display module that can readily be interfaced with conventional POS systems.

Another deficiency of known EPL systems is that they are designed for very limited communication and display, to minimize cost and battery consumption. Their displays are often difficult to read and accommodate very limited information. Their batteries require frequent replacement. It is desirable to provide a more robust pricing display unit that optionally provides a rechargeable power supply and/or a convenient external DC power source and is capable of vivid display of operator-selected information, such as advertising messages in continuously scrolling text.

Yet another deficiency with such EPL systems is that they do not communicate with barcode scanners. Inventory tracking typically entails scanning a barcode label at a shelf and entering the number of corresponding items on the shelf into an inventory tracking program. Unfortunately, conventional EPL systems do not display barcodes corresponding to UPC/SKUs. This shortcoming may be due in part to low power displays of EPLs that provide less contrast between a white stripe displayed adjacent to a black stripe than is available for a barcode printed on a black and white label. Low contrast between the elements of a displayed barcode can substantially reduce reliability of the scanning process. Thus, typical EPL systems do not render printed barcode labels unnecessary.

The invention is directed to overcoming one or more of the problems as set forth above.

SUMMARY OF THE INVENTION

To solve one or more of the problems set forth above, in an exemplary implementation of the invention, a digital display unit (DDU) is provided. The DDU may be integrated into an enterprise-wide networked system for managing and displaying price and product-related information. A plurality of DDUs (DDUs) may be included in the networked system. The DDUs are adapted to wirelessly receive price and product data from a local computer system and clearly display information based thereon. The local computer system includes a DDU control computer and a POS computer with a local POS product price database, from which the pricing data is obtained. The DDU control computer is configured to communicate price and product information to the communicatively coupled DDUs. Updating price information in the POS product price database causes the DDU control computer to communicate the price information to the communicatively coupled DDUs, such that price in the local POS product price database and the DDU are automatically synchronized.

The local computer system may be communicatively coupled to an enterprise computer system, which has an enterprise product price database. The enterprise computer system is configured to communicate pricing and product information to the communicatively coupled local computer systems. Updating pricing information in the enterprise computer system causes the enterprise computer system to communicate the pricing information to the communicatively coupled local computer systems, so that pricing in each local POS system product price database and the enterprise computer system are automatically synchronized.

An exemplary DDU includes a visual display, wireless communication components and internal processing circuitry. The DDU is capable of receiving and processing wireless signals, and storing and displaying information based thereon. In one embodiment, the DDU is configured for storing and displaying information for a plurality of products. The DDU may include a multi-line color display. The DDU may also include a synthetic barcode module configured to detect the presence of a barcode scanner and produce light output that emulates reflected light corresponding to a scanned barcode. Additionally, the DDU may include a battery and/or utilize one or more additional power sources, such as a power strip, photovoltaic cells or an AC adapter.

A DDU software module in the DDU control computer interfaces the local computer system with the DDUs. Upon a change in pricing in the POS database, the DDU software module causes the changed pricing information to be communicated to the corresponding DDU, according to a stored address for the DDU. In a preferred implementation, such pricing information is communicated via a wireless communications network.

BRIEF DESCRIPTION OF THE DRAWINGS

The foregoing and other aspects, objects, features and advantages of the invention will become better understood with reference to the following description, appended claims, and accompanying drawings, where:

FIGS. 7A and 7B provide diagrams that conceptually illustrate principles of an exemplary synthetic barcode process according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION

The invention is directed to a wireless display unit, referred to herein as a digital display unit or DDU, which may be integrated into an enterprise-wide networked system for displaying prices and product related information at store shelves, and includes a synthetic barcode module for detecting the presence of a barcode scanner and emitting light pulses substantially equivalent to light reflected from a printed barcode.

Figure 1:
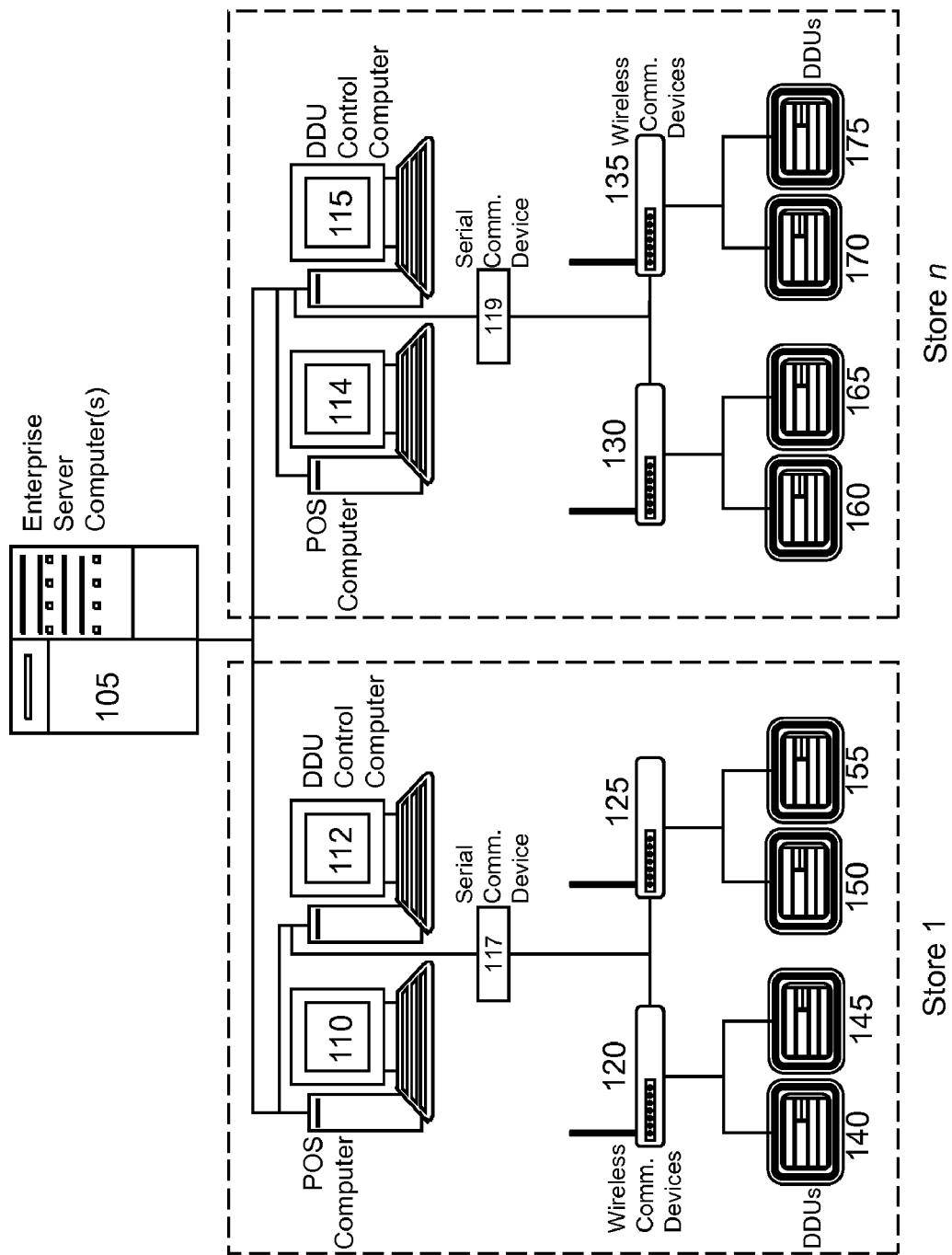
FIG. 1 shows a high-level block diagram of a enterprise-wide system that implements an exemplary embodiment of the invention.

Referring now to FIG. 1, a high-level block diagram of a system in accordance with an exemplary implementation of the invention is shown. An enterprise computer 105 hosts software for managing product related data and causing such data to be communicated to computer systems for stores, e.g., Store 1 . . . Store n. Each store computer system may include a DDU control computer 112 and 115 and a POS computer 110 and 114. The DDU control computer 112 and 115 and POS computer 110 and 114 may be physically separate networked computing devices, combined into one computing device, or distributed across a plurality of computing device. While FIG. 1 shows two stores, it is understood that the enterprise may include one or more stores, and that the invention does not require an enterprise computer 105. The invention is in not limited to the exemplary networked system shown in FIG. 1.

The local POS computers 110 and 114 are configured for managing product and sales related data. The DDU control computers 112 and 115 are configured for causing such data to be communicated to DDUs 140-175, such as via serial communications devices 117 and 119 and wireless communications devices 120-135. The DDUs 140-175 are configured to receive product information communicated via the wireless communications devices 120-135, store the information and produce displays based thereon.

The computing devices described above (e.g., enterprise computer 105, POS computer 110 and 114 and DDU control computer 112 and 115) may be comprised of commercially available computers, hardware and operating systems. Indeed, the aforementioned computing devices are intended to represent a broad category of computer systems capable of functioning in accordance with the present invention. Of course, the computing devices may include various components, peripherals and software applications provided they are compatible and capable of performing functions in accordance with the present invention. The computing devices also include information, documents, data and files needed to provide functionality and enable performance of methodologies in accordance with an exemplary embodiment of the invention. For example, the enterprise computer 105 may include application software that manages one or more databases of product data, including price information.

A firewall may be located between each DDU control computer 112 and 115 and POS computer 110 and 114 to protect against corruption, loss, or misuse of data. The firewall limits access by the DDU control computer 112 and 115 and prevents corruption of POS data. Thus, the DDU control computer 112 and 115 may access and receive only data that is necessary. Any sensitive information in the POS system, such as credit card information and personal identification number (PIN) data would be unavailable to the DDU Control Computer 112. The firewall may be comprised of any hardware and/or software suitably configured to provide limited or restricted access to the DDU Control Computer. The firewall may be integrated within the POS computer 110 and 114 or another system component, or may reside as a standalone component.

In an exemplary embodiment as depicted in FIG. 1, a serial communications device 117 and 119 facilitates digital communications between system components, such as DDU control computers 112 and 115 and wireless communications devices 120-135 and DDUs 140-175. The serial communications device may include, but is not limited to, Ethernet 100baseT, RS232, USB, and other serial communications modules. Optionally, the device could be implemented as a wireless communications component operating according to a wireless communication protocol, such as 802.11 or IRDA.

Figure 6:
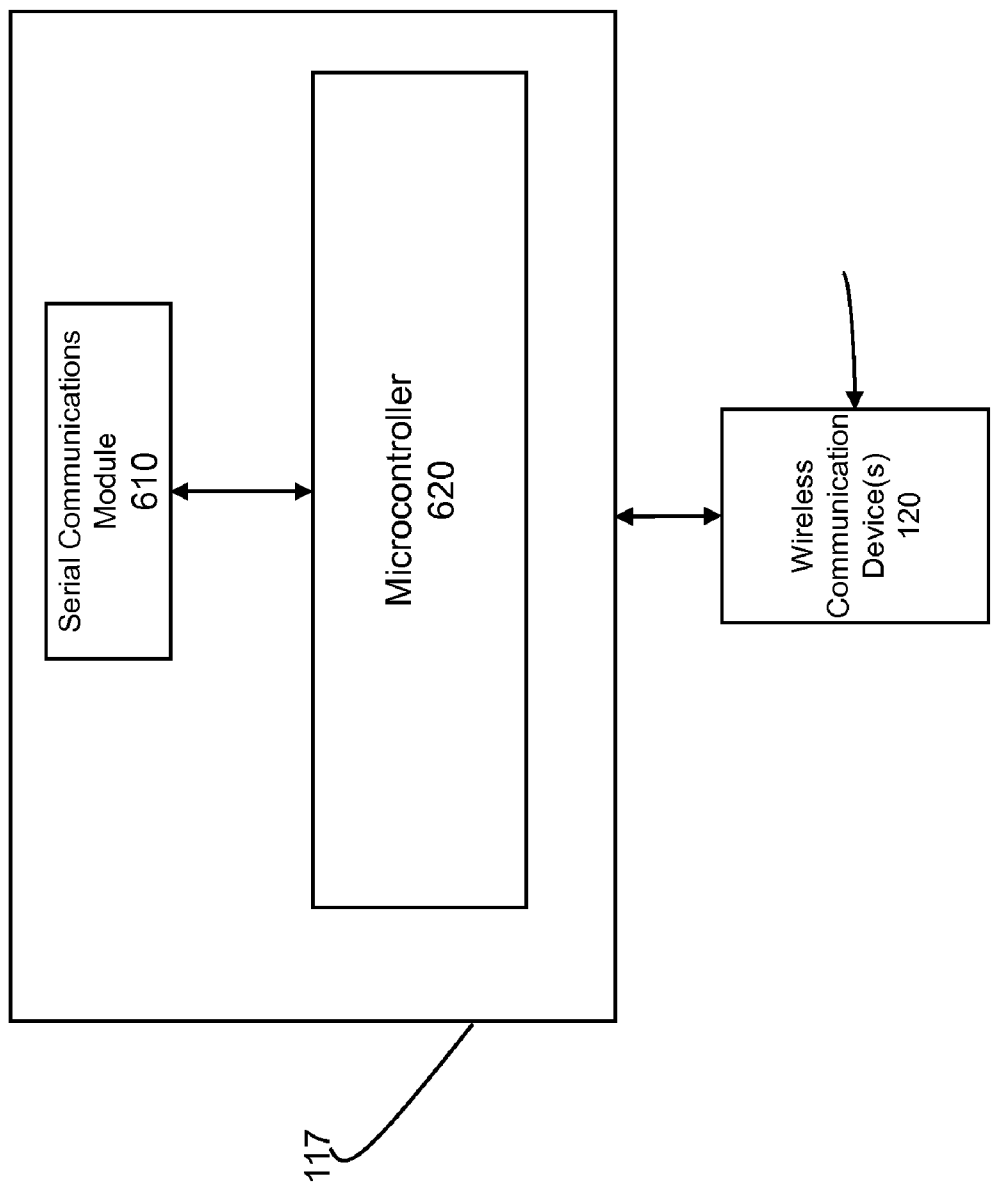
FIG. 6 provides a high level block diagram of components of an exemplary serial communication module according to principles of the invention.

As shown in FIG. 6, in addition to having a serial communications module 610, which may employ RS232, RS422, Ethernet, 802.11, IRDA, or any other protocol used to exchange data between computers, the serial communications device 117 and 119 has a microcontroller 620, which acts as a protocol converter for conversion between a protocol used to communicate with the DDU control computer 112 and 115 and a protocol used to communicate with the wireless communication devices 120-135. In other embodiments, the microcontroller could be another PC, or even a separate process on the DDU control computer 112 and 115, such as a process that communicates through a PCI interface board. The microcontroller 620 may have an internal clock oscillator that provides a time base for all serial communication operations. Alternatively, a crystal and associated circuitry may be utilized for a timing base. Those skilled in the art will appreciate that any device capable of timing and controllably directing data from stored memory to output pins for communication in a compatible format to the wireless communication devices 120-135 could be used and is intended to come within the scope of the invention.

In an exemplary embodiment as depicted in FIG. 1, a plurality of wireless communications devices 120-135 are used to communicate product information (e.g., data or signals) such as pricing information to DDUs. The communications devices 120-135 serve primarily as transmitters, although communications devices 120-135 which are capable of functioning as transceivers may also be used and required in implementations of the invention contemplating bi-directional communication with DDUs. Communications devices 120-135 may be spatially distributed around stores. Preferably, communications devices 120-135 are positioned in stores within a communicatively enabling range from the DDUs 140-175, such that signals communicated from the communications devices 120-135 are adequately received by the DDUs 140-175 for processing. While two communications devices 120-135 are shown per store, it is understood that each store may have one or more communications devices 120-135, depending upon the size of the store, the number and locations of DDUs 140-175 and the signal strength and communication capacity of the communications devices 120-135.

Wireless communication according to a preferred implementation of the present invention may comprise radio frequency (RF), optical and/or acoustic communication equipment, employing any well known wireless communication media, techniques and protocols now known in the art or later available. The communications devices 120-135 provide wireless connectivity between the local computer systems 110-115 and the DDUs 140-175.

By way of example and not limitation, the communications devices 120-135 may communicate with the DDUs 140-175 using one or more wireless LAN (WLAN) protocols, using low power, ultra wide band (UWB) communication signals or some other type of wireless signals for RF or optical (e.g., infrared) communication of information to DDUs. A real-time WLAN protocol or a standard wireless LAN protocol such as that of IEEE 802.11x, Bluetooth or IrDA may be used without departing from the scope of the present invention. A local network that connects the communications devices 120-135 to their respective local computer systems 110-115 may, for example, consist of a single, unified full duplex LAN, such as a 100BaseT Ethernet LAN. Alternatively, the local network may include two or more interconnected LANs or other network communications means. Any of a variety of other types of computer systems and associated applications may be provided on the network.

Figure 2:
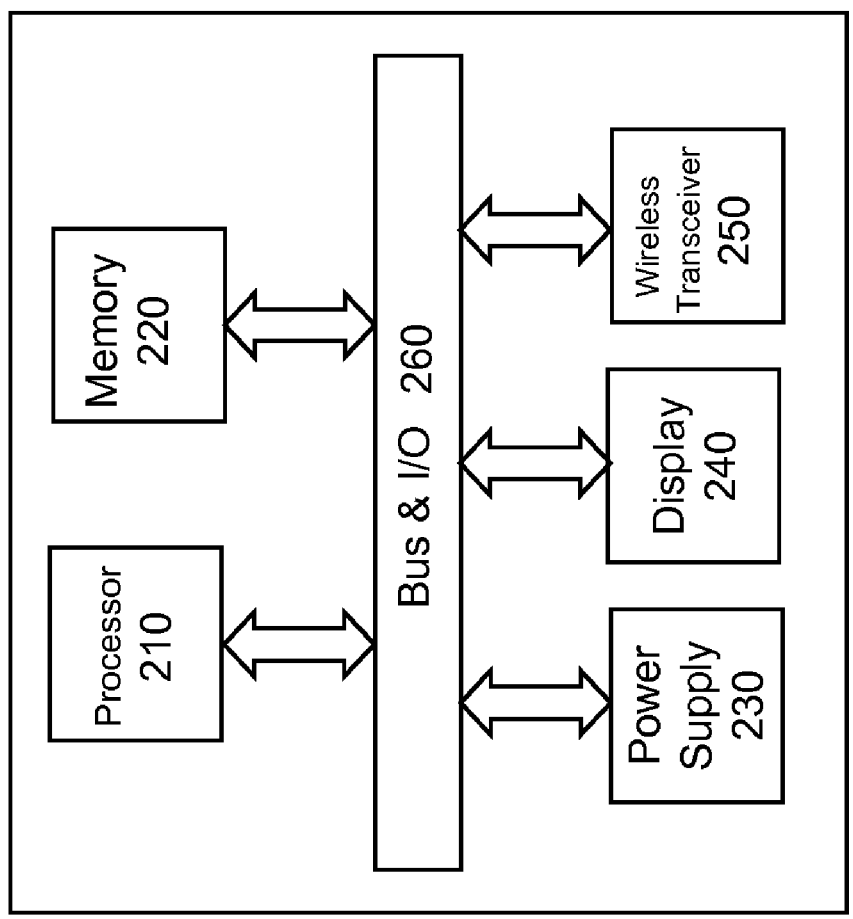
FIG. 2 shows a high level block diagram of components of an exemplary DDU according to principles of the invention.

A DDU according to the invention may take many forms. FIG. 2 shows a block diagram conceptually illustrating certain hardware components of a DDU 300 in accordance with an exemplary embodiment of the invention. The exemplary DDU includes a power supply 230 (e.g., one or more rechargeable or non-rechargeable disposable batteries, photovoltaic cells, and/or an AC adapter or other power supply means); a display 240 for visual output; a processor 210 adapted for processing data and performing computations; one or more memory modules 220 for temporary, read only, random access, volatile and/or non-volatile program and data storage; a receiver or transceiver 250 (collectively referred to herein as a transceiver) for wireless communications with an wireless communication device 120-135, and operably coupled through a bus 260 an I/O port and/or other means for connecting and communicating information among the components. The aforementioned DDU is intended to represent a broad category of devices capable of receiving wireless RF, optical or acoustic signals from a wireless communications device 120-135 and displaying information based thereon. Of course, the DDU may include fewer, different and/or additional components and arrangements of components, provided it is capable, when programmed and configured, of performing functions in accordance with the invention.

The memory modules 220, which enable storage of data and programs, may include RAM, ROM, flash memory and any other form of readable and writable storage medium known in the art or hereafter developed. The memory module 220 may be a separate component or an integral part of another component such as a processor 210.

The display 240 is configured for displaying various amounts of textual and/or graphical information. The display may be monochrome or color, of various physical dimensions, of various types. In one embodiment, the display may be suitable for displaying full motion video in color. By way of example and not limitation, the display may be comprised of a liquid crystal display (LCD); a field emission display FED; so called "E-ink" technologies, which employ microspheres having at least two reflectance states; a cathode-ray tube (CRT) display; a gas plasma display; an LED readout configured to display alpha-numeric and graphical information; or any other compatible visual display device. In a preferred implementation, the display is large enough to display, with clarity, one or more lines of information, as described more fully below. Optionally, the visual display device 240 may be configured with a touch-screen interface, to present a user with a graphical user interface.

The processor 210 may include a microprocessor or other devices capable of being programmed or configured to perform computations and instruction processing in accordance with the invention. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor.

Optionally, various ports and interfaces may be provided to communicate with peripherals, subsystems and systems. Such devices may include serial ports for bi-directional communications, and/or an optical communications (e.g., infrared) port for wireless line of sight communications. Other ports may include parallel and USB ports.

Figure 3:
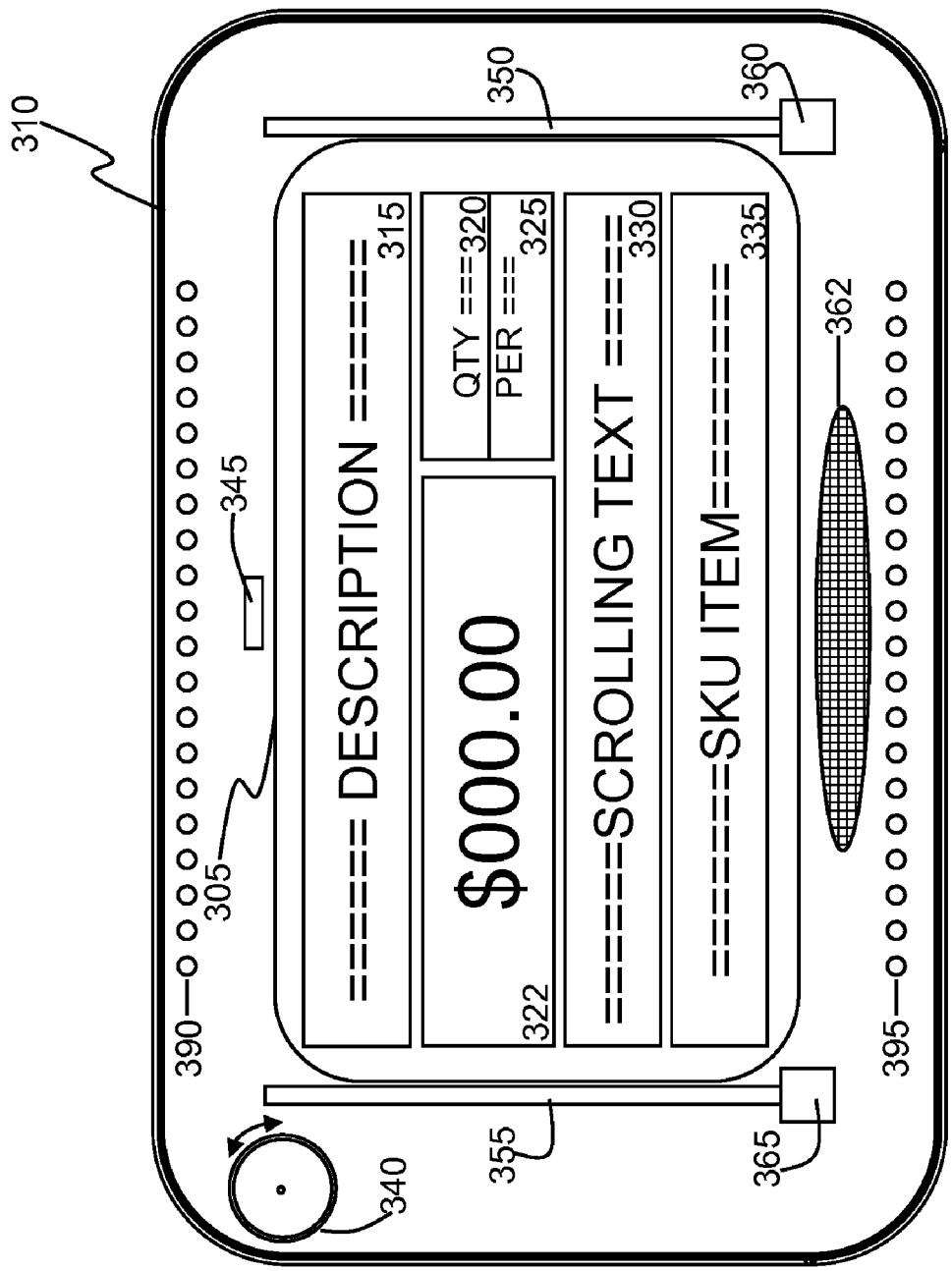
FIG. 3 is a front view of an exemplary DDU in accordance with principles of the invention.

Referring now to FIG. 3, a front view of an exemplary DDU 310 according to the invention is shown. In a preferred implementation, a highly perceptible display screen 305 is provided. The exemplary display screen 305 accommodates several lines of text. By way of example and not limitation, a top line 315 may accommodate a product description. A second line may conspicuously display a price 322, as well as quantity (e.g., feet or ounces) 320 and price per quantity unit (e.g., $/foot or $/ounce) information 325. A third line 330 accommodates additional product-related text, as described more fully below. The last line 335 may display any product-related information, such as an SKU, UPC or other product code. Additionally, the DDU 310 may display scrolling text 330. By using scrolling text, a message that is longer than the screen, and/or a plurality of sequential messages, may be displayed. The movement of scrolling text also provides an attention-getting function. Thus, the DDU 310 enables display of one or more advertising and promotional messages, which may be updated from time-to-time via wireless communication.

In another exemplary embodiment, the DDU 310 is configured to store and display prices and product-related information for a plurality of products. The DDU 310 may be programmed to cycle through displays for the supported merchandise, showing a display for a first product for a determined duration, and then showing a display for a second product for the determined duration, and so on, until displays have been rendered for each article of merchandise covered by the DDU. Then the cycle may repeat. Alternatively, or in addition to automatic cycling as described above, the DDU may be configured for manual control. For example, a consumer may use an input device such as a rotary dial 340, switches, buttons, or a touch sensitive screen to select a product covered by the DDU. This feature enables one conveniently positioned DDU to cover all products within a considerable area of shelf space.

A DDU may also be configured to play audio messages, songs, commercial advertising and the like. Digital audio data may be received via wireless communication and stored in memory 220, such as in a compressed format, such as MPEG-1 Audio Layer-III (MP3) format. An audio module may include a digital signal processor (or other processing device, such as processor 210) configured to decode the compressed audio data. The audio module may also include a digital-to-analog converter (not shown) configured to convert the decoded audio data to analog format, which may be played on any analog audio output device such as, for example, a speaker 362. An amplifier (also not shown) may be provided to enhance the audio output.

To attract attention, a DDU may also include a plurality of LEDs 390 and 395 that are operably coupled to the DDU processing and signal generation components and configured to controllably flash. While two parallel rows of LEDs 390 and 395 are shown, the invention is not limited to that number or arrangement of LEDs. Any number and arrangement of LEDs could be provided, within the limits of the DDU structure and components. For example, columns of LEDs could be provided along the sides of the DDU, in addition to or in lieu of the rows 390 and 395 provided along the top and bottom edges. The DDU may cause the LEDs to flash if a nearby consumer is detected or if a new product or special offer is featured on the DDU display. Additionally, any flashing patterns could be used. The LEDs could flash in harmony, randomly or sequentially, or groups (e.g., rows) could flash sequentially, randomly or alternately, or in any other manner likely to attract attention. One or more processing devices (e.g., processor 210, microcontroller 380 and/or another processing device) and one or more LED drivers (e.g., LED driver 385 and/or another LED driver) manages flashing of the LEDs according to predetermined or user-specified data and instructions.

One or more sensors, such as a motion and/or light sensor (e.g., sensor 360 and/or 365), may be provided to cause the DDU to activate the display and/or enable the audio output module upon detecting ambient light and/or the presence of a nearby pedestrian. Active and/or passive sensors may be used to react to detectable subject matter such as light, noise, radiation (e.g., heat), or changes in emitted energy, fields or beams. By way of example, passive infrared (PIR) sensors may be utilized. PIR sensors employ a pyroelectric transducer to react to infrared heat energy emitted by people. As the name implies, PIR sensors are passive, that is, the sensor does not transmit a signal. PIR sensors are typically designed to be maximally sensitive to objects that emit heat energy at a wavelength of around 10 microns (the peak wavelength of the heat energy emitted by humans). However, the invention is not limited to a particular type of sensor. Those skilled in the art will appreciate that other sensors may be used without departing from the scope of the invention. Examples of such other sensors include pressure sensitive mats; optical sensors configured to sense light; microwave sensors that use a Gunn diode operating within pre-set limits to transmit/flood a designated area/zone with an electronic field whereby movement in the zone disturbs the field and sets off an alarm; an ultrasonic sensor configured to react to a determined range of ultrasonic sound energy in a protected area; or any other sensor capable of providing motion detection capability in accordance with principles of the invention. Such sensors may help conserve battery power by deactivating the DDU display and audio output after business hours, when lights are turned off, and when consumers are not in the vicinity.

Figure 8A:
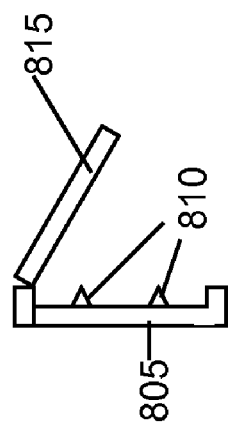
FIGS. 8A, 8B and 8C conceptually illustrate an exemplary power strip engagement device and provide plan and profile views of a power strip containing a pair of conductive wires.
Figure 8B:
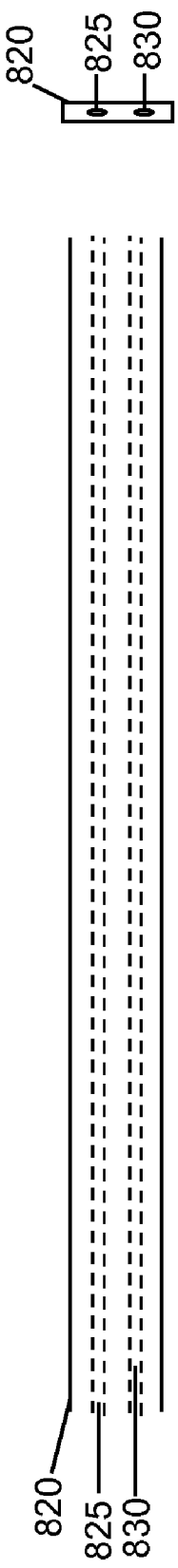
Figure 8C:
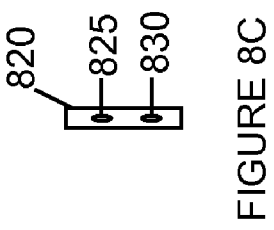

In another exemplary embodiment, a DDU is equipped with a power strip adapter, as shown in FIG. 8A. The adapter is configured for engaging (without severing) conductive wires 825 and 830 of a power strip 820, as shown in FIGS. 8B and 8C. The adapter may be comprised of a channel 805, two or more conductive, insulating piercing contacts 810, and a closure 815. The channel 805 receives a length of a power strip 820 comprised of insulated parallel strands of conductive wire 825 and 830. When the closure 815 is shut, the contacts 810 pierce the insulation layer of the power strip and electrically contact the wires 825 and 830 without severing them. The electrical contacts may be operably coupled to the DDU, such that the DDU receives electrical power via the contacts. The power strip may receive electrical power from a remote outlet. An AC adapter may be used to generate suitable DC power in the power strip. One side of the power strip 820 may include an adhesive or magnetic surface or other attachment mechanisms that facilitate attaching the strip to store shelves. This embodiment reduces power consumption concerns, without requiring installation of new electrical outlets.

In yet another exemplary embodiment, the DDU includes a synthetic barcode module. The module is configured to emit light pulses that emulate light reflected to a barcode scanner from a scanned printed barcode, which may be any type of barcode, such as, for example, UPC, SKU, EAN, Interleaved 2 of 5, Code 93, Code 128, Code 39, or any other standardized or specially designed type of barcode. A typical barcode scanner uses a scanning beam, typically narrow band light in the visible spectrum such as red laser, but potentially any bandwidth of light in the visible or infrared spectra, to pass over a sequence of dark (e.g., black) bars and light (e.g., white) spaces comprising a barcode. Scanning may progress sequentially left to right and/or right to left. As the beam of light scans across a barcode, such as a barcode 700 shown in FIG. 7A, the beam is at least partially reflected back to the scanner by the spaces and at least partially absorbed by the bars. A receiver, such as a photocell detector, in the barcode scanner receives the reflected beam and converts it into an electrical signal. As the beam scans across the barcode, the scanner typically creates one electrical signal for the spaces where the beam is reflected, and a different electrical signal for the bars where the beam is absorbed. This process is conceptually illustrated by the signal stream 710 in FIG. 7B. The scanning speed and the width of each space and bar determine the duration of each electrical signal. The signals (including its duration) are decoded by the scanner or by an external processor into characters that the barcode represents.

The synthetic barcode scanning module includes an assembly that is intended to be the target of the standard inventory barcode scanners used by retailers for automatic UPC/SKU entry. The assembly generally includes a light source 345, one or more light pipes 350 and 355, and one or more optical sensors 360 and 365.

The light source controllably produces light pulses comparable to reflected light received by a barcode scanner upon scanning a barcode. The light pulses may be generated in any wavelength compatible with a barcode scanner. Any suitable light source, such as LED, laser, infrared transmitter, backlit LCD, may be utilized to controllably generate the desired light pulses. By way of example and not limitation, one or more LEDs 345 may be used to produce the light pulses that will be interpreted by the barcode scanner as the reflected light from a printed barcode that is being emulated. The LED 345 array produces pulses of light with on and off timing to simulate the bright and dark reflective surfaces of a printed barcode being scanned by the laser of a UPC/SKU scanner. LED 345 may be comprised of a row of LEDs horizontally arranged across a scan area, to provide direct light signals to a barcode scanner throughout a range of scanning.

Each light pipe 350 and 355 receives light from a scanning beam that crosses anywhere along the length of the light pipe 350 and 355. The light pipe sends the received light to an optical sensor 360 and 365, which is configured to detect the presence and transit time of the scanning laser beam.

Each optical sensor 360 and 365 is configured to receive light from the corresponding light pipe 350 and 355. A sensor 360 and 365 is used to detect when the scanning area is being scanned by a barcode reader. When laser light is sensed by the sensor, a signal is produced to signify that a barcode scanner is present.

The sensor 360 and 365 may also be employed to measure the transit time of the beam across the specified scanning area. Illustratively, the sensor may be configured to produce a low (logical state) signal when no laser is detected and a high signal when a laser is detected. The time between successive high signals corresponds to one scanner sweep. A microcontroller (or other logical computing device) can determine a scan rate (e.g., in scans per second) from the duration of one scan sweep. Assuming, for example, a scan rate is 60 scans per second, then in 1/60 of a second, the light pulses corresponding to a barcode are received by the scanner. The duration of each light pulse may equal the scan time multiplied by a fraction, the numerator of which is the width of the reflecting white space corresponding to the pulse and the denominator of which is the width of the scanned area (e.g., the width of the barcode). Thus, the transit time information may be used to control the rate and duration of pulses sent from the LED 345 so that the emitted light signal is equivalent to the light that would be reflected from a printed version of the barcode. Only one optical sensor 360 or 365 might be needed in some embodiments, merely to detect the presence of a scanning laser.

Optionally, a barcode scanning rate may be hard-coded or an input value to the system. For example, an operator may select a scanner make and model from a list available at the DDU control computer 112 and 115. Based upon the selection, a software driver may be loaded that provides a scanning rate for communication to all or selected communicatively coupled DDUs. The driver may also supply other scanner-specific characteristics, such as reflected light parameters, to enhance reliability of the scanning process. Illustratively, such parameters may be utilized if the DDU includes a variable light source or a plurality of light sources, such as a laser and an LED, each of which provides different wavelengths of light to increase the compatibility of the DDU with different barcode scanners.

Figure 3A:
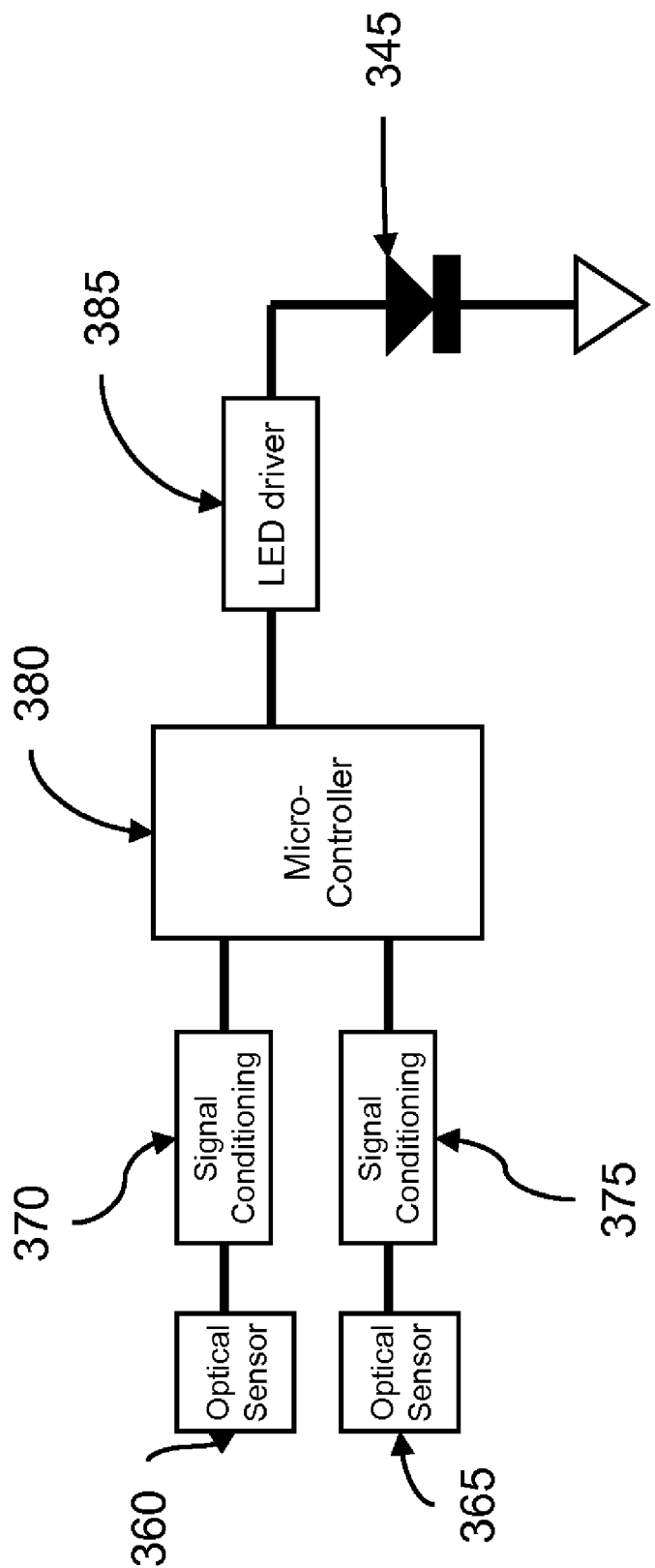
FIG. 3A is a high level block diagram of signal processing components of an exemplary synthetic barcode module according to principles of the invention.

Referring now to FIG. 3A a high level block diagram of signal processing components of an exemplary synthetic barcode module according to principles of the invention is shown. A signal conditioner 370 and 375 improves the signal to noise ratio from each optical sensor 360 and 365 and supplies logic level signals to a microcontroller 380 when a scanning laser is observed.

The microcontroller 380 receives conditioned signals from the optical sensors 360 and 365 via the signal conditioners 370 and 375, reacts to the presence of a scanning light beam and possibly measures transit time. The microcontroller 380 may be comprised of any suitable controlling device, such as a logic circuit, a microprocessor, a combination of these elements, and the like. It is understood that the transit time measurement may not be needed in some embodiments of this invention. The microcontroller 380 may have an internal clock oscillator as the time base for all operations. Alternatively, a crystal and associated circuitry may be utilized for a timing base. It may also have internal memory, which may store programming for the module and a table that determines the time and duration the LED 345 must be illuminated in order to generate light pulses comprising the synthetic barcode signal. The timing data for barcode synthesis may reside in the microcontroller 380 from manufacture or may be downloaded at some later point through any type of communications medium, e.g. RS232, RF data link, optical data link, etc.

An LED driver 385 supplies a correct amount of drive to the LED 345. In some embodiments, the LED driver 385 may be comprised of one or more pins on the microcontroller 380 with a current limiting resistor. A switched current source or current sink may be used to drive the LED 345.

Figure 4A:
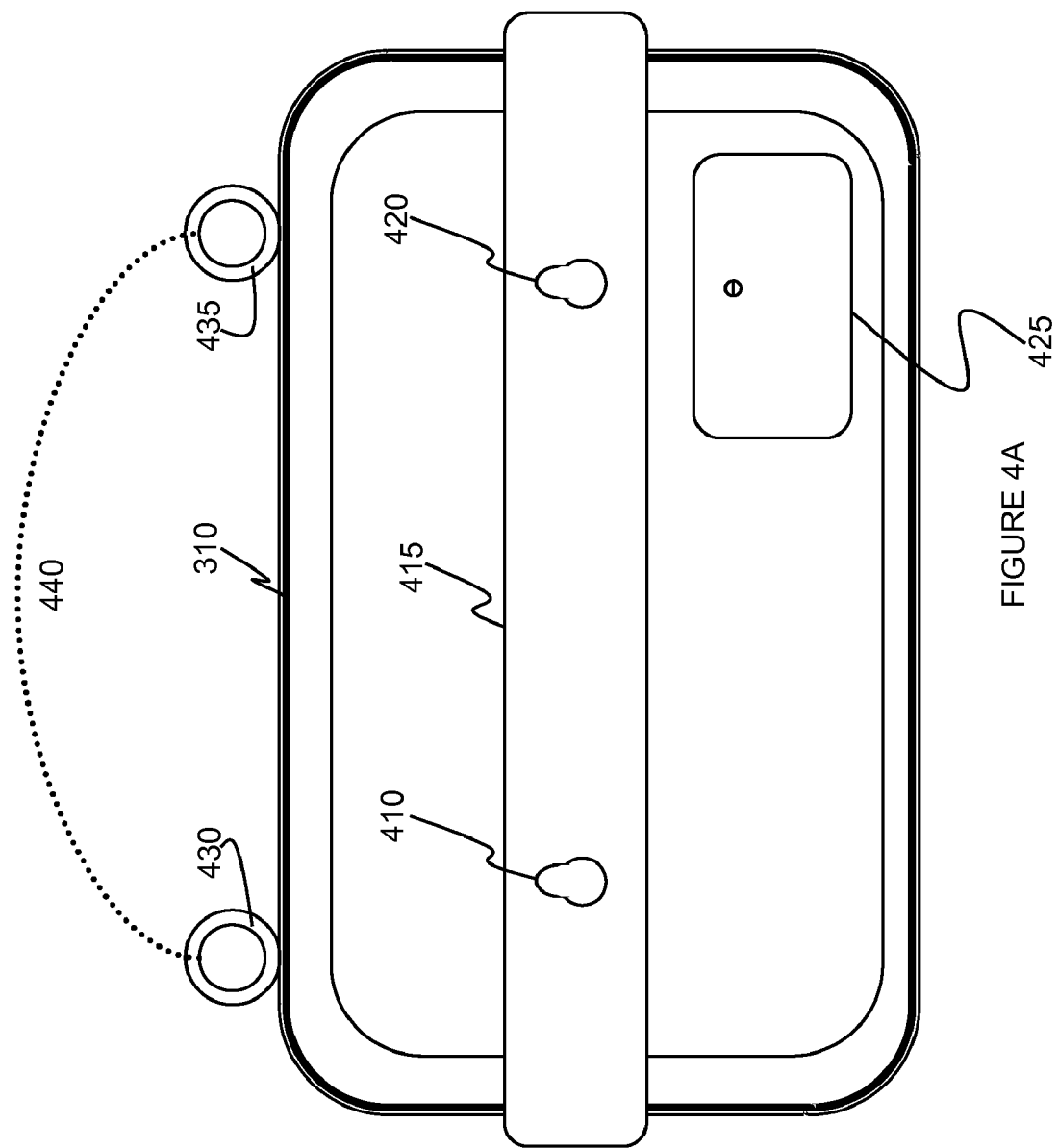
FIGS. 4A and 4B are back and side views, respectively, of an exemplary DDU in accordance with principles of the invention.
Figure 4B:
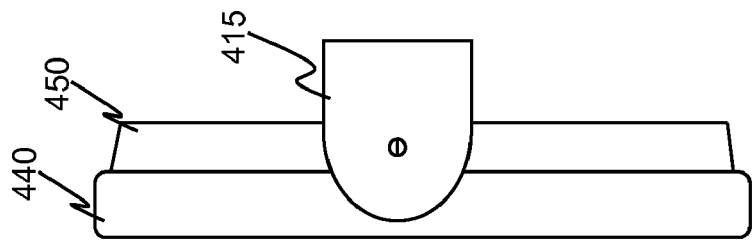

Referring now to FIG. 4, a back view of an exemplary DDU 310 is provided. An optional pivotal mounting bracket 415 is provided to secure the DDU 310 to a shelf. If the DDU 310 is secured on a high shelf, the bracket 415 enables the screen to be pivoted slightly downward to enhance visibility. If the DDU 310 is mounted on a low shelf, the bracket enables the screen to be pivoted slightly upward to enhance visibility. A pair of mounting holes 410 and 420 are provided on the exemplary bracket 415 to engage screws. A battery compartment 425 is also provided for receiving a rechargeable or disposable battery as a power supply. Other suitable power supplies include, but are not limited to, external AC or DC power sources, photovoltaic cells and the like. Eyehooks 430 and 435 and a chain 440 may also be provided to conveniently suspend and/or lock the DDU to a shelf or other structure.

Optionally, the DDU may feature a rugged, shock-resistant design. A rugged shock-resistant housing forming a protective enclosure for the internal components of the DDU. The housing may be comprised of two sections 440 and 450 attached together by bonding and/or mechanical fasteners. Each section may be comprised of a high impact strength material, such as a metal (e.g., aluminum or alloy) or high impact strength plastic or composite materials. A gasket formed of rubber or other polymeric, preferably elastomeric, material provides a sealing engagement between housing sections 440 and 450 to provide protection to the internal components from moisture, dust and debris. A shock absorbing member may also encase the perimeter of the display. A protective transparent cover (e.g., Lexan) may be placed over the display screen to reduce the risk of scratching and breakage without interfering with displayed images. Additionally, a plurality of shock mounts may be provided to absorb physical shock imparted onto internal components. The shock mounts may be constructed of soft, deformable, elastomeric materials.

Referring again to FIG. 1, the POS computer 110 and 114 includes a POS database management system for managing POS data. The POS database may contain aggregations of data records or files, pertaining to sales transactions, prices, inventory, and other items. A communications network interconnects the DDU control computer 112 and 115 with the POS computer 110 and 114. The interconnected computers communicate with each other through mechanisms such as interprocess communication, remote procedure call, distributed object interfaces, and various other program interfaces. The POS database may be queried using various database access means such as SQL (Structured Query Language), a standard language for interacting with a database; Open Database Connectivity (ODBC), an open standard API for accessing a database; DCOM (Distributed Component Object Model), a set of Microsoft tools and program interfaces for enabling client program objects to request services from server program objects on another networked computer; Common Object Request Broker Architecture (CORBA), an architecture and specification which allows programs at different locations and developed by different vendors to interact in a network through an interface broker. Illustratively, the DDU control computer 112 and 115 may execute one or more processes that interact with remote data, such as product price data stored on the POS computer 110 and 114. Processes on the POS computer 110 and 114 and DDU control computer 112 and 115 may communicate and exchange information with one another via communication pathways between them called interprocess communication pathways or sockets. Utilizing interprocess communication, for example, the DDU control computer 112 and 115 may submit access requests to the POS computer 110 and 114. Each request received by the POS computer 110 and 114 may be submitted as a TCP/IP communication packet including an IP address and socket number. In response to valid requests, the POS computer 110 and 114 may provide data from the POS database to the DDU control computer 112 and 115, without compromising the integrity of the database or interfering with POS processes.

Figure 5:
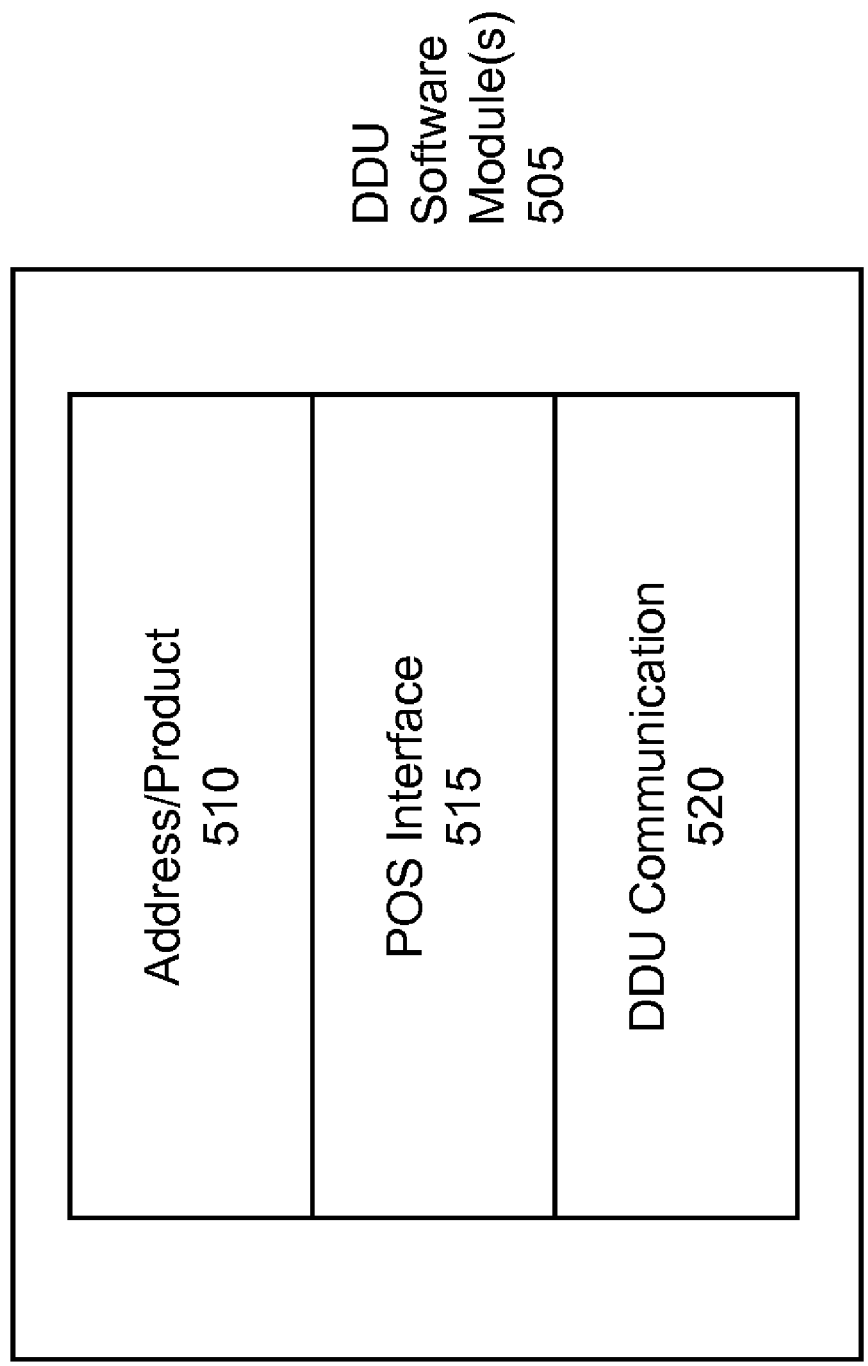
FIG. 5 provides a high level block diagram of exemplary software components of a DDU control computer system according to principles of the invention.

Referring now to FIG. 5, a high-level block diagram of software components of a DDU (software) module 505 according to an exemplary implementation of the invention is provided. The DDU software module 505 may reside on each DDU control computer 112 and 115. In a preferred implementation, each DDU is assigned a unique address (e.g., a MAC address) to distinguish it from all other DDUs within a store. The DDU addresses are associated with products (e.g., UPCs or SKUs) in a table, list or database, as illustrated by software module component 510. DDU addresses may be set in software, hardware or firmware. Thus, a DDU may be identified by its unique address, or by the products associated with the DDU.

A POS interface 515 interfaces with and monitors and receives price and product information from a POS system on the local POS computer 110 and 114. As discussed above, the POS database may be queried using various database access means such as SQL, ODBC, DCOM and CORBA. Monitoring entails determining when prices are changed in the POS system pricing database. The prices may be changed locally or by a remote networked enterprise computer system 105. By way of example and not limitation, a price change may be detected by comparison of current database entries or file properties with prior database entries or file properties, or by intercepting and analyzing price change requests using a software shim before the requests are executed, or by receiving a price change instruction from the local POS computer 110 and 114, or by any other technique for detecting database changes. Upon detecting a price change, the POS interface 515 retrieves the updated price and product information (e.g., UPC or SKU) from the POS system pricing database. The product information is matched to a DDU address 510.

After the revised pricing information is associated with a DDU address, the revised pricing information and DDU address may be wirelessly transmitted to the corresponding DDU using the DDU communication software component 520. The DDU is configured to receive, store and process signals associated with the DDU's address. All received signals that are not associated with a DDU's address are not processed for display by the DDU and may be deleted. Optionally, switches and other known networking devices and processes may be used to communicate signals through only the wireless communication device in closest proximity to the destination DDU. This approach reduces the amount of irrelevant signals received by a DDU.

The DDU transmit component 520 may also be configured to transmit product-related information other than or in addition to pricing information. Such product-related information may include a product description, quantity (e.g., feet or ounces) price per quantity unit (e.g., $/foot or $/ounce), information for a scrolling text display. The information may be transmitted along with each pricing update and/or upon user command.

Accessory and peripheral devices, such as a printer, signature pad, magnetic stripe reader, and barcode scanner may be operably coupled to a DDU to support additional functionality. For example, a card reader may accept information encoded information on a magnetic strip card such as a credit card, debit card, driver's license, customer loyalty card, employee id, or other items equipped with magnetic strips. Information obtained therefrom may then be communicated to a communicatively coupled computer, such as a DDU control computer and/or a POS system computer. A barcode scanner may be configured to scan a printed barcode on a product, card (e.g., customer loyalty card), document or other medium, for storage, processing and/or transmission of the information encoded by the barcode. A printer may be configured to generate coupons or other printed subject matter based upon instructions and information communicated to the DDU by a DDU control computer. The DDU to which such devices are connected may communicate with the devices through one of a number of interfaces, such as, by way of example and not limitation, a serial interface (e.g., RS232 interface), a PS2 interface, a universal serial bus (USB) interface or any other compatible interface.

The exemplary DDU 310 provides several advantages over conventional price tags and electronic price display labels. For example, the DDU 310 features dramatically enhanced visibility and utility over conventional price tags and electronic price display labels. As the DDU may store and display information for a plurality of products in a controlled manner, a single DDU to may be dedicated to a number of products covering large sections of shelf space. Additionally, the several lines of display enable the device to be used to display more information than conventional price tags and electronic price display labels. Furthermore, the scrolling text 330 enables display of various messages, including advertising that may be changed from time to time. Moreover, the DDU's ability to communicate product barcodes renders unnecessary the laborious and error-prone practice of manually labeling shelves with printed barcodes.

While the invention has been described in terms of various embodiments, implementations and examples, those skilled in the art will recognize that the invention can be practiced with modification within the spirit and scope of the appended claims including equivalents thereof. The foregoing is not intended to limit the invention to the exact construction and operation shown and described. Alternative embodiments of the invention, including variations in size, materials, components, shape, form, function, manner of operation, assembly and use that are obvious to one skilled in the art are intended to be encompassed by the invention. Accordingly, all suitable modifications and equivalents may be resorted to, falling within the scope of the invention.

What is claimed is:

1. A wireless digital display unit comprising a processing device, a wireless receiver configured to receive price data, a memory operably coupled to the processing device and configured to store the price data, a multi-line display configured to display the price data, a power supply, and a synthetic barcode module, said synthetic barcode module including a light source, a controller operably coupled to the light source configured for controllably generating light pulses, a light pipe and a sensor operably coupled to the light pipe and to the controller, said controller being adapted to control generation of light pulses by the light source, said light pulses being similar to light reflected from a scanned barcode.

2. A wireless digital display unit according to claim 1, wherein the multi-line display includes at least one scrolling line for displaying scrolling text comprised of subject matter from the group consisting of alphanumeric characters and graphical images.

3. A wireless digital display unit according to claim 1, wherein the wireless receiver is configured to receive price data for a plurality of products, the memory is configured to store the price data for the plurality of products, and the multi-line display is configured to display the price data for the plurality of products.

4. A wireless digital display unit according to claim 3, further comprising a product selection device adapted to enable user selection of a display corresponding to a product.

5. A wireless digital display unit according to claim 1, wherein the controller is adapted to control timing and duration of light pulses by the light source.

6. A wireless digital display unit according to claim 5, wherein the digital display unit is adapted to detect the presence of a barcode scanner by sensing the presence of scanning laser using the sensor.

7. A wireless digital display unit according to claim 5, wherein the digital display unit is adapted to detect the scan rate and direction of a barcode scanner by sensing the presence of scanning laser at a point of a first scan and at the same point of a next scan.

8. A wireless digital display unit according to claim 5, wherein the digital display unit is adapted to receive user-selected data corresponding to a scan rate of a barcode scanner.

9. A wireless digital display unit according to claim 1, further including a tiltable mounting bracket for mounting to a structure.

10. A wireless digital display unit according to claim 1, wherein the wireless receiver is a receiver from the group consisting of an optical receiver, a radio frequency receiver and an acoustic receiver.

11. A wireless digital display unit according to claim 1, wherein the wireless receiver is a transceiver.

12. A wireless digital display unit according to claim 1, further comprising a speaker configured for producing audible output, a digital to analog converter configured for producing analog audible output signals, said signals being communicated to said speaker.

13. A wireless digital display unit according to claim 1, further comprising at least one led adapted to controllably flash, said at least one LED being mounted in a position to attract attention of a person nearby the digital display unit.

14. A wireless digital display unit according to claim 1, further comprising a sensor from the group consisting of a first sensor adapted to sense the presence of a person nearby the digital display unit and a second sensor adapted to sense light.

15. A wireless digital display unit according to claim 1, further comprising a communicatively connected peripheral device from the group consisting of a printer, signature pad, magnetic stripe reader, and barcode scanner.

16. A wireless digital display unit comprising a processing device, a wireless receiver configured to receive price data, a memory operably coupled to the processing device and configured to store the price data, a multi-line display configured to display the price data, and a power supply, wherein the power supply is comprised of a power strip adapter configured to conductively engage a power strip comprised of a pair of insulated current carrying wires, said adapter including a pair of contacts configured to penetrate insulation of the insulated current carrying wires and to make electrical contact with the current carrying wires without severing the wires.

17. An electronic price display system comprising:
a remote server,
a local computer system communicatively coupled to the remote server,
a wireless communication device communicatively coupled to the local computer system,
a plurality of digital display units communicatively coupled to the wireless communication device, each of said plurality of digital display units being associated with and positioned adjacent to a product, and each of said plurality of digital display units comprising a processing device, a wireless receiver configured to receive price data, a memory operably coupled to the processing device and configured to store the price data, a multi-line display configured to display the price data, a power supply, and a synthetic barcode module, said synthetic barcode module including a light source, a controller operably coupled to the light source configured for controllably generating light pulses, a light pipe and a sensor operably coupled to the light pipe and to the controller, said controller being adapted to control generation of light pulses by the light source, said light pulses being similar to light reflected from a scanned barcode;
said local computer system being adapted to automatically communicate price information for a product to a digital display unit associated with and positioned adjacent to the product,
wherein said remote server is adapted to communicate price information for a product to a digital display unit associated with and positioned adjacent to the product.

18. The system of claim 17, wherein the wireless communication devices communicate via optical, acoustic or radio frequency communication.

19. The system of claim 17, wherein said remote server is adapted to communicate barcode information for a product to a digital display unit associated with and positioned adjacent to the product.

* * * * *